United States Patent
Broecheler

(10) Patent No.: US 10,754,853 B2
(45) Date of Patent: Aug. 25, 2020

(54) VIRTUAL EDGE OF A GRAPH DATABASE

(71) Applicant: DataStax, Inc., Santa Clara, CA (US)

(72) Inventor: Matthias Broecheler, Seattle, WA (US)

(73) Assignee: DataStax, Inc., Santa Clara, CA (US)

( * ) Notice: Subject to any disclaimer, the term of this patent is extended or adjusted under 35 U.S.C. 154(b) by 438 days.

(21) Appl. No.: 14/933,697

(22) Filed: Nov. 5, 2015

(65) Prior Publication Data

US 2018/0081937 A1 Mar. 22, 2018

(51) Int. Cl.
*G06F 16/2453* (2019.01)
*G06F 16/22* (2019.01)
*G06F 16/23* (2019.01)
*G06F 16/901* (2019.01)
*G06F 16/28* (2019.01)

(52) U.S. Cl.
CPC .......... *G06F 16/2453* (2019.01); *G06F 16/22* (2019.01); *G06F 16/2322* (2019.01); *G06F 16/28* (2019.01); *G06F 16/9024* (2019.01)

(58) Field of Classification Search
CPC .............. G06F 11/3447; G06F 17/243; G06F 16/9024; G06F 17/5072; G06F 8/45; G06F 16/2453
See application file for complete search history.

(56) References Cited

U.S. PATENT DOCUMENTS

| 5,706,503 A | 1/1998 | Poppen |
| 7,861,226 B1 | 12/2010 | Episkopos |
| 2011/0029571 A1 | 2/2011 | Aggarwal |
| 2012/0317142 A1 | 12/2012 | Broecheler et al. |
| 2013/0166600 A1* | 6/2013 | Snyder, II ........... G06F 16/2246 707/797 |
| 2013/0275429 A1* | 10/2013 | York ..................... G06F 16/435 707/737 |
| 2014/0280362 A1 | 9/2014 | Henderson |
| 2014/0310302 A1 | 10/2014 | Wu |
| 2014/0337373 A1 | 11/2014 | Morsi |
| 2015/0026158 A1* | 1/2015 | Jin ..................... G06F 17/30958 707/722 |
| 2015/0033106 A1 | 1/2015 | Stetson |
| 2015/0067695 A1 | 3/2015 | Hamamoto |
| 2015/0269279 A1* | 9/2015 | Bosshart ............. G06F 17/3033 707/798 |
| 2015/0381756 A1* | 12/2015 | Lotfallah ............ H04L 67/2814 709/213 |
| 2016/0173340 A1* | 6/2016 | Latham ................. H04L 41/145 370/254 |
| 2016/0188656 A1* | 6/2016 | Ekanadham ........... G06F 9/547 707/755 |

(Continued)

OTHER PUBLICATIONS

Bröcheler et al., Probablistic Similarity Logic, 2012.

(Continued)

*Primary Examiner* — Mariela Reyes
*Assistant Examiner* — Courtney Harmon
(74) *Attorney, Agent, or Firm* — Van Pelt, Yi & James LLP

(57) ABSTRACT

At least a portion of a graph database having a plurality of vertex-centric indices is stored. A virtual edge to be generated is identified based on a plurality of edges of the graph database. The virtual edge connecting at least a pair of vertices that were not previously directly connected is generated. The plurality of vertex-centric indices is updated to include information about the virtual edge.

20 Claims, 8 Drawing Sheets

(56) References Cited

U.S. PATENT DOCUMENTS

| | | | |
|---|---|---|---|
| 2016/0212022 A1* | 7/2016 | Abou Mahmoud | .. H04L 43/045 |
| 2016/0350662 A1 | 12/2016 | Jin | |
| 2017/0068746 A1 | 3/2017 | Levin | |
| 2017/0104668 A1* | 4/2017 | Zhang | ................... H04L 45/121 |

OTHER PUBLICATIONS

Bach et al., Hinge-Loss Markov Random Fields and Probablistic Soft Logic, May 17, 2015.

Bröcheler et al., Computing Marginal Distributions over Continuous Markov Networks for Statistical Relational Learning, 2010.

Bach et al., Scaling 2012 MPE Inference for Constrained Continuous Markov Random Fields with Consensus Optimization, 2012.

Pugliese et al., Efficient Multiview Maintenance under Insertion in Huge Social Networks, Mar. 2014.

Shakarian et al., Using Generalized Annotated Programs to Solve Social Network Diffusion Optimization Problems, Jan. 2013.

Bröcheler et al., COSI: Cloud Oriented Subgraph Identification in Massive Social Networks, 2010.

Bröcheler et al., DOGMA: A Disk-Oriented Graph Matching Algorithm for RDF Databases.

Bröcheler et al., Efficient Multi-View Maintenance in the Social Semantic Web, Apr. 2012.

Bröcheler et al., A Budget-Based Algorithm for Efficient Subgraph Matching on Huge Networks, 2011.

Matthias Broecheler, Using Histograms to Better Answer Queries to Probablistic Logic Programs, May 4, 2009.

Simari et al., Promises Kept, Promises Broken: An Axiomatic and Quantitative Treatment of Fulfillment, 2008.

Matthias Broecheler, Social Network Data Management, 2011.

Bröcheler et al., Probablistic Similarity Logic, 2010.

Albanese et al., PLINI: A Probablistic Logic Program Framework for Inconsistent News Information, 2011.

Broecheler et al., A Scalable Framework for Modeling Competitive Diffusion in Social Networks, 2010.

Kemal Erdogan: "A Model to Represent Directed Acyclic Graphs (DAG) on SQL Databases", Jan. 14, 2008, pp. 1-16, retrieved from Internet, URL: http://www.codeproject.com/Articles/22824/A-Model-to-Represent-Directed-Acyclic-Graphs-DAG-o [retrieved on Feb. 14, 2014].

Max Neunhoffer: "Graphs in data modeling?-?is the emperor naked?", Mar. 13, 2015, Retrieved from the Internet, URL: https://medium.com/@neunhoef/graphs-in-data-modeling-is-the-emperor-naked-2e65e2744413 [retrieved on Mar. 4, 2019].

* cited by examiner

VIRTUAL EDGE OF A GRAPH DATABASE

BACKGROUND OF THE INVENTION

In computing, a graph database uses graph structures with nodes, edges, and associated properties to represent and store data. A graph database provides index-free adjacency. Every element contains a direct pointer to its adjacent elements and no index lookups are necessary. Compared with relational databases, graph databases are often faster for associative data sets, and map more directly to the structure of object-oriented applications. As they depend less on a rigid schema, they are more suitable to manage ad hoc and changing data with evolving schemas.

However, traditional computer architecture requires data to be stored and accessed in sequential order. In order to map the multi-dimensional data of the graph data to the limited dimensionality of existing computer architecture, tradeoffs have to be made with respect to data locality and performance. Additionally, as the graph database becomes larger, it becomes inefficient and often impractical to store the database on a single storage/machine. Efficiently and effectively dividing up graph data for storage in different locations becomes important. Despite efforts to ensure data locality for data of the graph that is likely to be accessed together, often situations arise where processing a graph database query requires access across remote portions of a storage and/or across different storage devices/servers. For example, traversing a graph to locate a desired vertex that is not directly adjacent to a subject vertex but is adjacent to an adjacent intermediary vertex of the subject vertex may take a long time because data of different vertices may be stored in different remote servers/storages. Although this poor performance may be acceptable for infrequent queries, it may be unacceptable for critical and/or frequently utilized queries. Additionally, as types of queries and data stored in the graph database change over time, any optimization needs to be flexible enough to adapt to these changes. Therefore, there exists a need for a flexible and efficient way to improve performance of a graph database.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Graph data may be used to model pairwise relations between objects. For example, a graph includes vertices (e.g., nodes) and edges (e.g., lines) connecting the vertices with relationships. An edge may be undirected (e.g., no distinction between two vertices connected by an edge) or directed from one vertex to another vertex. Properties may be associated with a vertex or an edge. For example, any number of pairwise key value pairs may be associated with a vertex or an edge as a property of the vertex/edge to identify data about the associated vertex/edge.

Figure 1A:
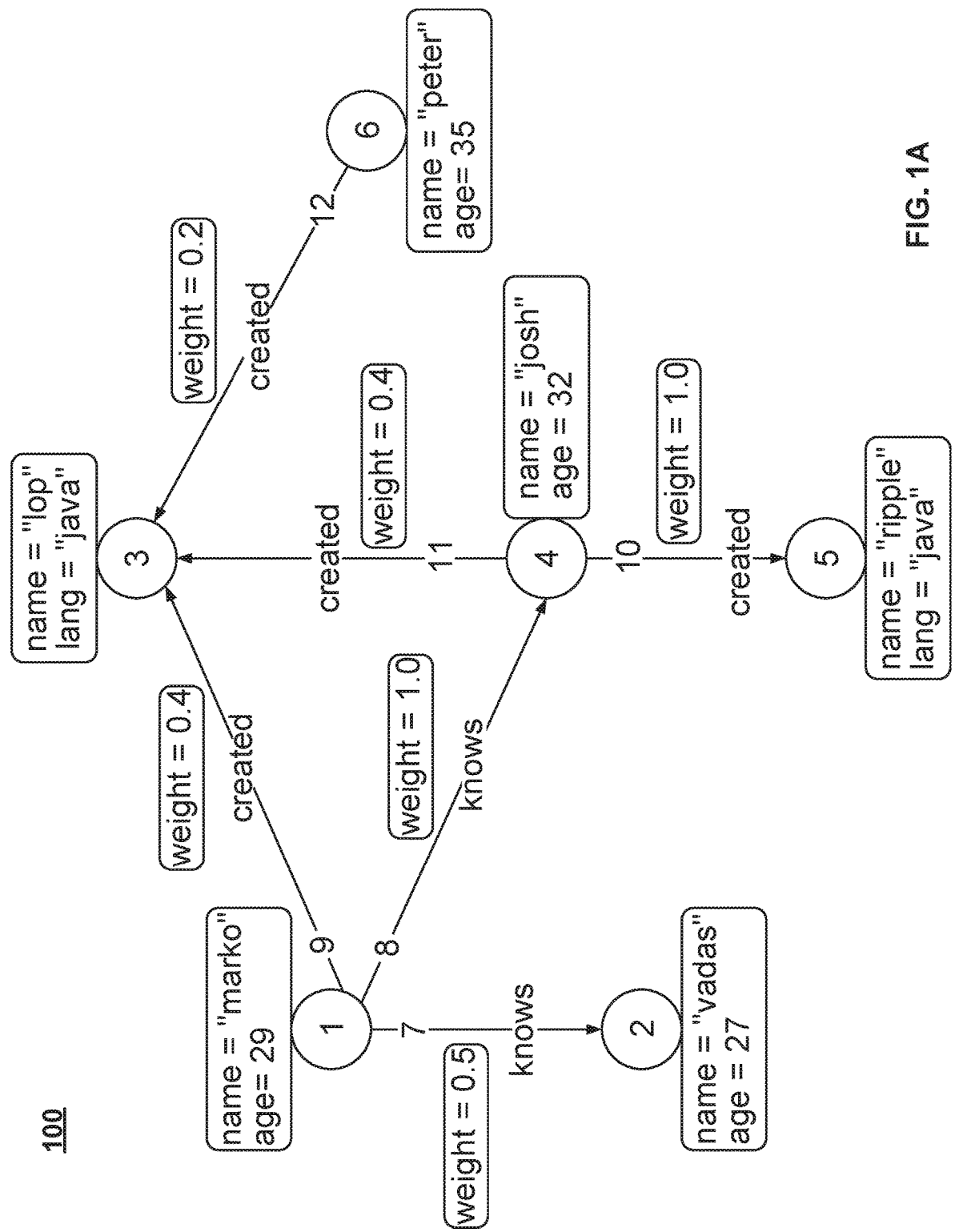
FIG. 1A is a diagram illustrating an example graph data model.
Figure 1B:
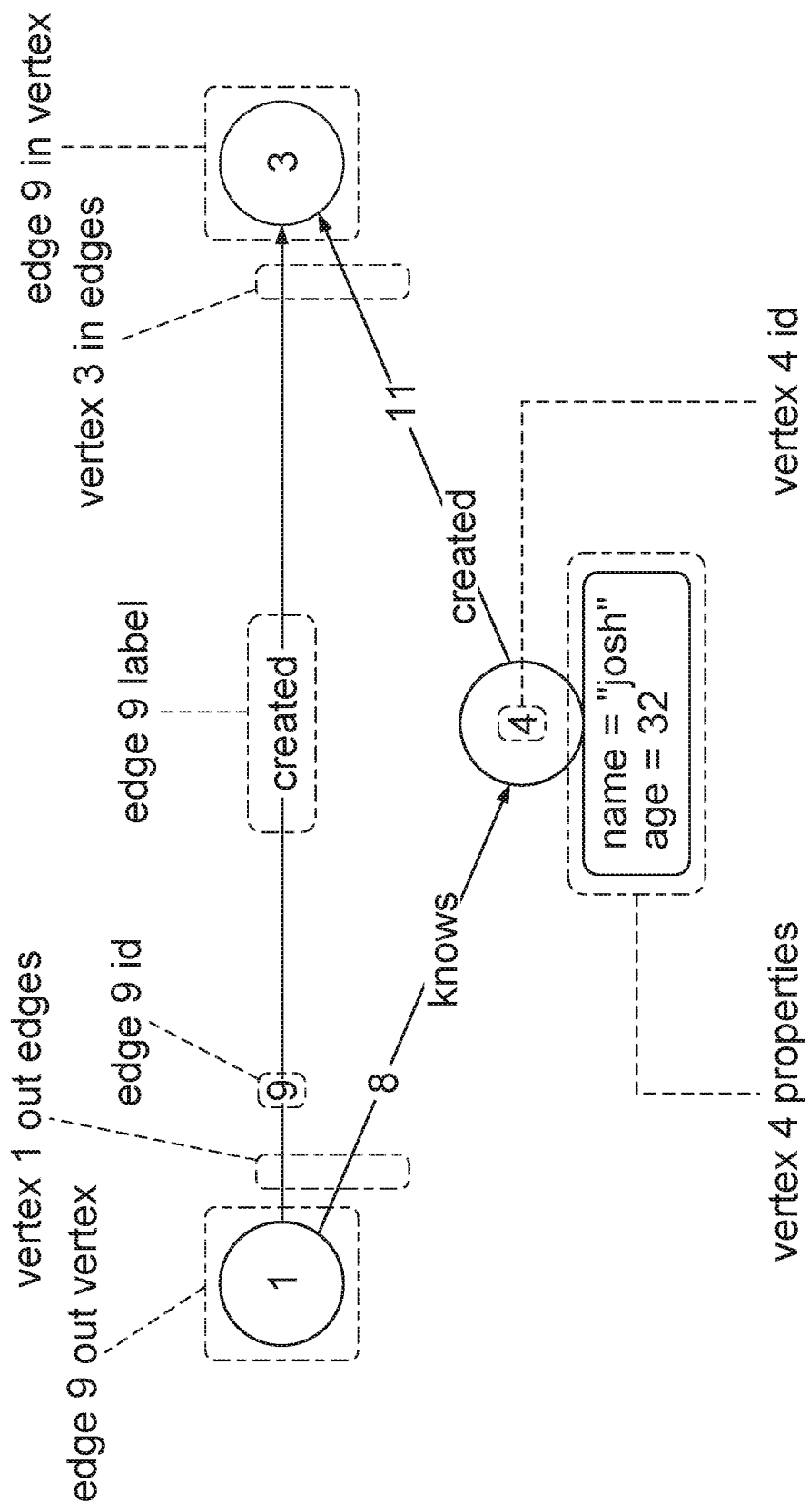
FIG. 1B is a diagram identifying a portion of graph 100 of FIG. 1A.
Figure 1C:
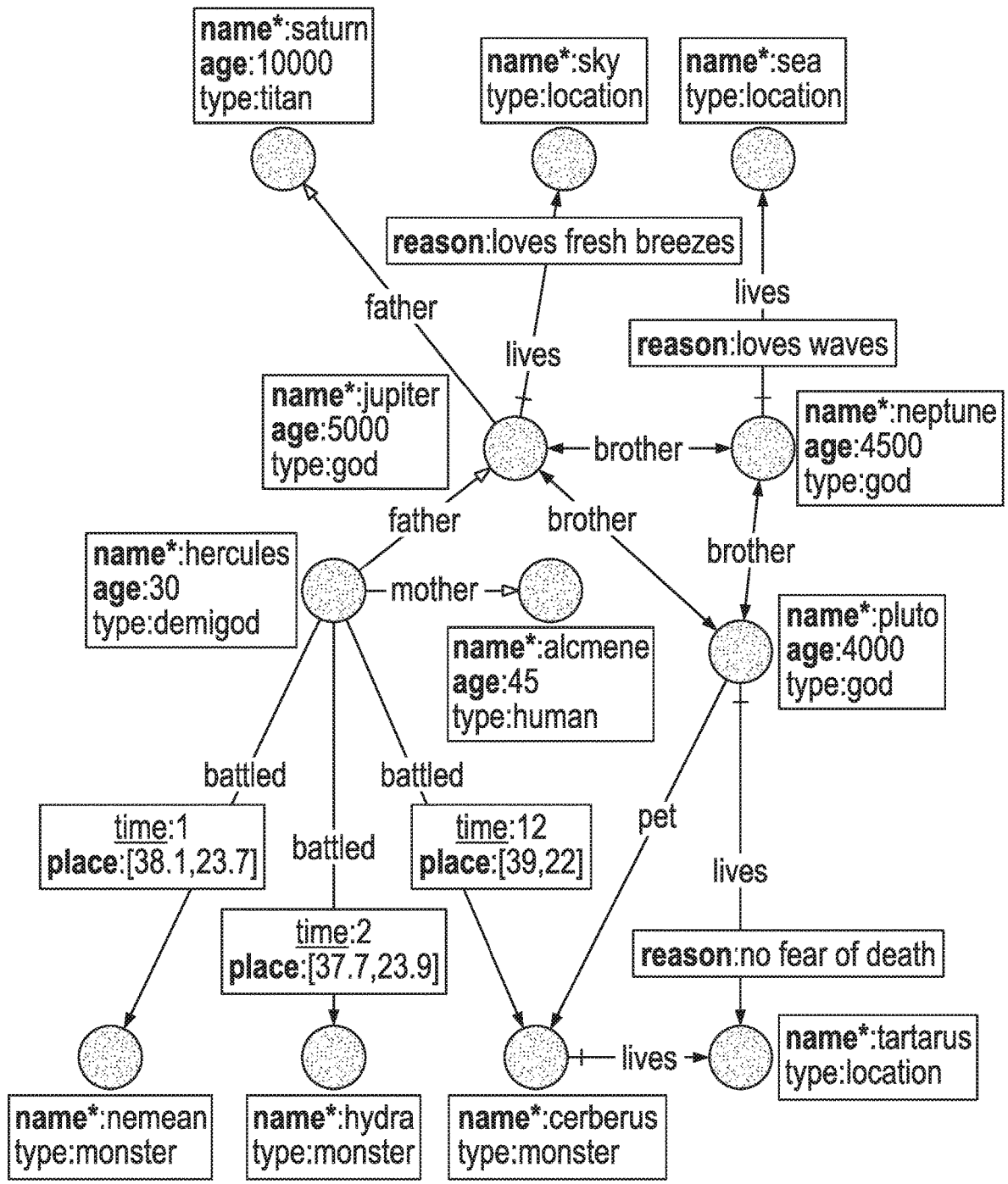
FIG. 1C is a diagram illustrating another example graph data model.

FIG. 1A is a diagram illustrating an example graph data model. FIG. 1A shows graph 100 that includes vertices and edges and associated labels, identifiers, and properties. FIG. 1B is a diagram identifying a portion of graph 100 of FIG. 1A. FIG. 1B shows graph portion 102 of graph 100 of FIG. 1B. As shown in this example graph data model, a vertex is connected to another vertex via an incoming/outgoing edge. The directed edge has a tail vertex and a head vertex. For an undirected edge, the edge connects two member vertices without a specified directionality. As shown in FIGS. 1A and 1B, each vertex may include one or more of the following elements: a label identifying the vertex, an assigned identifier that uniquely identifies the vertex, a set of one or more incoming edges, a set of one or more outgoing edges, a set of one or more undirected edges, and a set of one or more properties (e.g., key-value pairs) about the vertex. Each edge may include one or more of the following elements: a label identifying the edge, an assigned identifier that uniquely identifies the edge, an outgoing tail vertex, an incoming head vertex, a pair of undirected vertices, and a set of one or more properties (e.g., key-value pairs) about the edge. FIG. 1C is a diagram illustrating another example graph data model. The property graph model 110 describes the relationships between the beings and places of a Roman pantheon. Special text and symbol modifiers in the diagram (e.g., bold, underline, etc.) denote different schematics/typings in the graph.

Improving the speed of retrieval of information from a graph database is disclosed. In some embodiments, at least a portion of a graph database having a plurality of vertex-centric indices is stored. For example, a plurality of indices that are each specific to a particular vertex of the graph database is generated and stored. One example vertex-centric index may index all edges of a particular vertex. A plurality of virtual edges is automatically generated. One example is a virtual edge in an inferred edge that completes a triangle between three vertices in a data model of the graph database. In one example, if a query to find a twice removed vertex from an origin vertex is a common query, rather than locating the twice removed vertex by traversing an edge of the origin vertex to obtain the adjacent vertex and then following another edge of the adjacent vertex to finally obtain the twice removed vertex, a direct virtual edge between the origin vertex and the twice removed vertex is generated to create a direct connection between the origin vertex and the twice removed vertex. A plurality of vertex-centric indices is updated to include information about the virtual edge. For example, the vertex-centric indices of the vertices connected by the virtual edge are updated to include the virtual edge.

Figure 2:
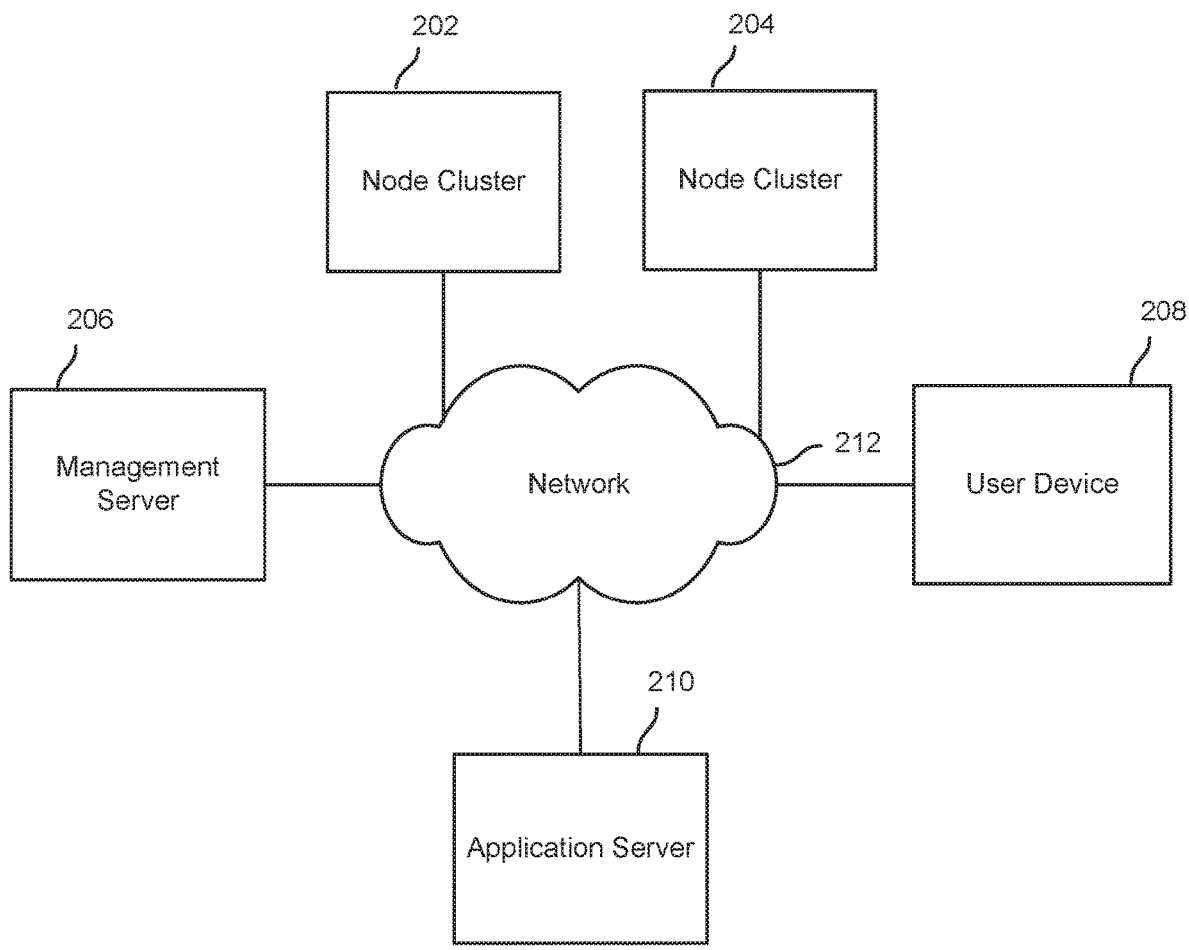
FIG. 2 is a block diagram illustrating an embodiment of a graph database deployment environment.

FIG. 2 is a block diagram illustrating an embodiment of a graph database deployment environment. Node cluster 202, node cluster 204, management server 206, user device 208, and application server 210 are connected together via network 212. User device 208 may be any computer of a user such as a laptop, a desktop, a tablet, a smartphone, a wearable device, etc. Application server 210 provides one or more applications and/or services (e.g., SaaS) to user device 208. The applications and/or services provided by application server 210 may access a node of node cluster 202 and/or a node of node cluster 204 to obtain and/or process data stored in a graph database. For example, application server 210 provides a database query to a node of a node cluster to obtain graph data desired by an application. In some embodiments, user device 208 directly accesses a node of node cluster 202 and/or a node of node cluster 204 to obtain desired graph data.

Node cluster 202 and node cluster 204 each include one or more nodes. These nodes store and/or process graph database data. Each node may include a computer/server and/or storage. Rather than storing an entire copy of the graph database on a single storage node and processing the graph database queries on a single server, the storage and processing are distributed among the nodes. Each node stores a portion of the graph database and multiple copies of the data of the graph database are distributed across a plurality of nodes to enable fault tolerance and load balancing. Node cluster 202 and node cluster 204 may be physically located in different geographical regions to reduce the average physical distance between a user of the database and its closest node. In some embodiments, each node may be dynamically assigned one or more functions including real-time analytics and search processing.

In some embodiments, node cluster 202 and/or 204 provides a graph database using a NoSQL database platform. For example, node cluster 202 and/or 204 includes Apache Cassandra nodes. By utilizing the Apache Cassandra database to store graph data, linear scalability and high fault-tolerance may be achieved. For example, data may be replicated real-time to different nodes and data centers. In some embodiments, node cluster 202 and/or 204 includes Apache Solr nodes that provide a search platform for the graph data. In some embodiments, node cluster 202 and/or 204 includes Apache Hadoop nodes. In some embodiments, node cluster 202 and/or 204 includes Apache Spark nodes for data processing. In some embodiments, node cluster 202 and/or 204 includes Apache HBase nodes that store the graph database data. In various embodiments, node cluster 202 and/or 204 includes one or more of the following types of nodes that store the graph database data: Oracle NoSQL, MongoDB, Redis, Memcached and DynamoDB. In various embodiments, various different types of databases may be utilized to store graph data to form the graph database.

Management server 206 may allow a network administrator to monitor, configure, and manage node clusters 202 and/or 204. For example, performance metrics, errors, system status, configuration tools, automation tools, and other node cluster functions are provided via a web-based visual interface provided by management server 206.

Examples of network 212 include one or more of the following: a direct or indirect physical communication connection, a mobile communication network, a wireless network, Internet, intranet, Local Area Network, Wide Area Network, Storage Area Network, and any other form of connecting two or more systems, components, or storage devices together. Other communication paths may exist and the example of FIG. 2 has been simplified to illustrate the example clearly. Although limited instances of the components shown in FIG. 2 have been shown to simplify the diagram, additional instances of any of the components shown in FIG. 2 may exist. For example, a plurality of different client devices access a plurality of different application servers that utilize node clusters 202 and/or 204. Any number of node clusters may exist. Components not shown in FIG. 2 may also exist to provide a graph database.

Figure 3:
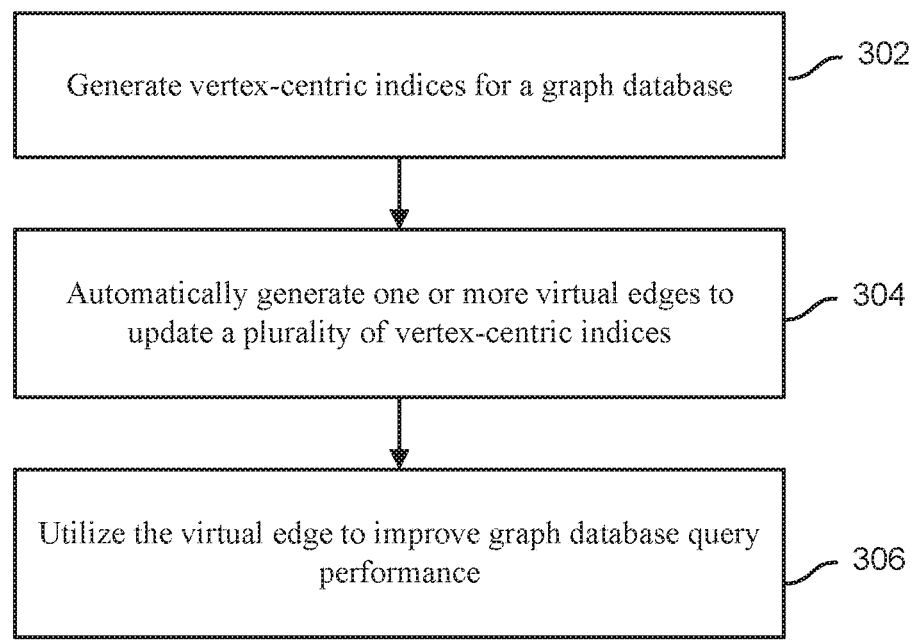
FIG. 3 is a flowchart illustrating an embodiment of a process for improving a graph database search performance.

FIG. 3 is a flowchart illustrating an embodiment of a process for improving a graph database search performance. The process of FIG. 3 may be implemented on one or more nodes of node cluster 202 and/or node cluster 204.

At 302, vertex-centric indices for a graph database are generated. Graph database queries are often formed from the perspective of a vertex. For example, a query may desire to identify edges of a particular vertex that match the query. In another example, a query may desire to identify an adjacent/neighbor vertex connected to the subject vertex that matches the query criteria. Rather than traversing an entire large graph of the entire dataset to locate a desired edge and/or vertex, a separate vertex-centric index for each vertex may be generated to enable fast vertex-centric query processing. Additionally to locate a particular information about an edge or a neighbor vertex of a subject vertex, the desired information can be located with a single lookup in the vertex-centric index rather than traversing every edge/vertex of the subject vertex. In some embodiments, the vertex-centric index for a subject vertex may index data associated with at least a desired portion of one or more of the following: identifiers, labels, properties and/or directionality of edges connected to the subject vertex and identifiers, and/or properties of other vertices directly connected to the subject vertex. For example, the vertex-centric index includes a table of connected edges and adjacent vertices for a particular vertex.

In some embodiments, a vertex-centric index is specific to a vertex. Such indices are contrary to a graph index that is global to the entire graph (e.g., indexing elements for fast global lookups). In some embodiments, the purpose of vertex-centric indices is to sort and index the incident edges (and thus, adjacent vertices) of a vertex according to the incident edges' labels and properties. In large graphs vertices may have thousands of incident edges. Traversing through those vertices can be very slow because a large subset of the incident edges has to be retrieved and then filtered in memory to match the conditions of the traversal. Vertex-centric indices can speed up such traversals by using localized index structures to retrieve only those edges that need to be traversed. Given a vertex query, these indices may be leveraged and, in doing so, linear scans of incident edges (O(n)) can be avoided and faster graph traversals ensue (O(1) or O(log n)).

In the example of graph data of FIG. 1C, suppose that "hercules" battled hundreds of monsters in addition to the three captured as shown in graph 110 of FIG. 1C. Without a vertex-centric index, a query asking for those monsters battled between time point "10" and "20" would require retrieving all "battled" edges even though there are only a handful of matching edges. Building a vertex-centric index by time may speed up such traversal queries.

Using the Titan Graph Database of DataStax of Santa Clara, Calif., the following code may be utilized to build a vertex-centric index, which indexes "battled" edges in both directions by time in decreasing order:

```
mgmt = g.getManagementSystem( )
time = mgmtmakePropertyKey('time').dataType(Integer.class).make( )
battled = mgmt.makeEdgeLabel('battled').make( )
mgmt.buildEdgeIndex(battled,'battlesByTime',Direction.
  BOTH,Order.DESC,time);
```

In this example code, a vertex-centric index is built against a particular edge label which is the first argument to the index construction method TitanManagement.buildEdgeIndex( ) The index only applies to edges of this label—battled in the example above. The second argument is a unique name for the index. The third argument is the edge direction in which the index is built. The index will only apply to traversals along edges in this direction. In this example, the vertex-centric index is built in both directions which means that time restricted traversals along "battled" edges can be served by this index in both the "IN" and "OUT" direction. Titan will maintain a vertex-centric index on both the in- and out-vertex of "battled" edges. Alternatively, one could define the index to apply to the "OUT" direction only which would speed up traversals from "hercules" to the monsters but not in the reverse direction. This may only require maintaining one index and hence result in half the index maintenance and storage cost. The last two arguments are the sort order of the index and a list of property keys to index by. The sort order is optional and defaults to ascending order (e.g., "Order.ASC"). The list of property keys must be non-empty and defines the keys by which to index the edges of the given label. A vertex-centric index may be defined with multiple keys.

The following example extends the schema by a "rating" property on "battled" edges and builds a vertex-centric index which indexes "battled" edges in the out-going direction by rating and time in decreasing order. The order in which the property keys are specified may be of importance because vertex-centric indices are prefix indices—"battled" edges are indexed by "rating" first and "time" second.

```
mgmt = g.getManagementSystem( )
time = mgmt.makePropertyKey('time').dataType(Integer.class).
  make( )
```

-continued

```
rating = mgmt.makePropertyKey('rating').dataType(Decimal.
  class).make( )
battled = mgmt.makeEdgeLabel('battled').make( )
mgmt.buildEdgeIndex(battled,'battlesByRatingAndTime',
  Direction.OUT,Order.DESC,rating,time);
```

For the following queries, the "battlesByRatingAndTime" index can speed up the first two but not the third query.

```
h.outE('battled').has('rating',LARGER_THAN,3.0).inV
h.outE('battled').has('rating',5.0).interval('time',10,50).inV
h.outE('battled').interval('time',10,50).inV
```

In some embodiments, multiple vertex-centric indices are built for the same edge label in order to support different constraint traversals. In some embodiments, a graph database query optimizer attempts to pick the most efficient index for any given traversal.

At 304, one or more virtual edges are automatically generated to update a plurality of vertex-centric indices. In some embodiments, generating the one or more virtual edges includes identifying one or more virtual edge generation rules and implementing the virtual edge generation rules. In the example of FIG. 1C, a common search query might be to find a vertex that has a grandfather relationship with a subject vertex. Finding this grandfather vertex might require two edge traversals. For example, for the "hercules" subject vertex of graph 110 of FIG. 1C, the "father" edge is traversed to obtain the "jupiter" vertex that is the "father" of the "hercules" vertex and from the "jupiter" vertex, another "father" edge is traversed again to obtain the grandfather "saturn" vertex desired by the initial query. However, finding this grandfather vertex required two levels of traversals of edges. For example, if vertex-centric indices were utilized, two different vertex-centric indices (e.g., vertex-centric index of "hercules" vertex and vertex-centric index of "jupiter" vertex) would have to be utilized. In some cases, the information about the "hercules" vertex (e.g., its vertex-centric index) may be stored in a different node or cluster than information about the "jupiter" vertex (e.g., its vertex-centric index). Requiring traversal of multiple levels of edges and/or use of multiple vertex-centric indices to perform a graph database query may result in unacceptable performance.

In some embodiments, rather than requiring the multiple levels of edge traversals, a direct "path" between the subject vertex and another vertex that previously was not directly connected to the subject vertex is generated as a virtual edge. For example, a "grandfather" relationship virtual edge is generated to directly connect the "hercules" vertex with the "saturn" vertex of graph 110 of FIG. 1C. The virtual edge may serve as the third edge to complete a triangle between the three vertices (e.g., between "hercules," "jupiter," and "saturn" vertices). However, only the middle vertex (e.g., the "focal vertex") of the three vertices has complete knowledge of the edges to detect the virtual edge. For the example of graph 110 of FIG. 1C, only the "jupiter" focal vertex is directly connected to the "father" edges to detect the grandfather relationship between "hercules" and "saturn" vertices (e.g., only the vertex-centric index of "jupiter" vertex has enough information to detect the virtual edge because the vertex-centric index of "hercules" vertex and the vertex-centric index of "saturn" vertex are missing information about one of the "father" edges). In some embodiments, when data of the focal vertex is utilized to detect and generate a virtual edge, the generated virtual edge is provided to be inserted in the vertex-centric indices of the vertices to be connected using the virtual edge. For example, a "grandfather" virtual edge detected using the edges of the "jupiter" vertex (e.g., detected using vertex-centric index of "jupiter" vertex) is provided to be stored/indexed in the vertex-centric index of the "hercules" vertex and the vertex-centric index of the "saturn" vertex. As new data is added/removed/modified from the graph database, any affected virtual edges would also need to be identified and added/removed/modified, if appropriate. Although virtual edge examples associated with two component edges have been described (e.g., virtual edge forming a triangle), any number of a plurality of edge traversals may be represented by a virtual edge in various embodiments.

At 306, the virtual edge is utilized to improve graph database query performance. In some embodiments, a query that can utilize the virtual edge is automatically identified and the query is configured to utilize the virtual edge when performing the query. For example, rather than requiring a user/entity providing the search query to know the existence of the virtual edge relationship and provide exact search queries that specify the use the virtual edge when performing the search query, the user/provider of the search query is not required to know about the virtual edge to take advantage of the virtual edge. For example, a traditional query provided by a provider that specifies a multilevel edge traversal is analyzed to detect that the query is able to take advantage of an existing virtual edge. In the event the query can be optimized to utilize the virtual edge, a portion of the search query is optimized (e.g., modified, combined, etc.) to utilize the virtual edge instead of the multilevel edge traversal.

Figure 4:
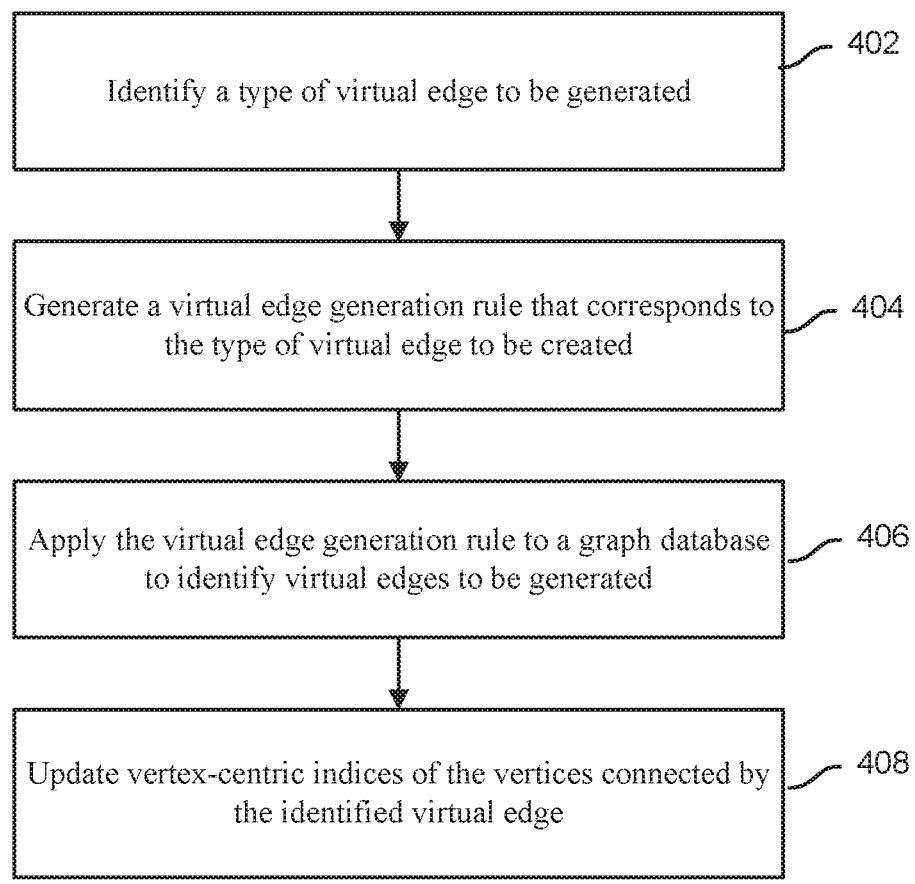
FIG. 4 is a flowchart illustrating an embodiment of a process for applying a virtual edge generation rule.

FIG. 4 is a flowchart illustrating an embodiment of a process for applying a virtual edge generation rule. The process of FIG. 4 may be implemented on one or more nodes of node cluster 202 and/or node cluster 204. In some embodiments, the process of FIG. 4 is included in 304 of FIG. 3.

At 402, a type of virtual edge to be generated is identified. In some embodiments, identifying the type of virtual edge includes receiving a specification of a desired type of virtual edge to be detected and generated for data of a graph database. For example, a database administrator or another user has manually identified a specific type of multilevel edge relationship between vertices that are often searched in queries and would be beneficial to be optimized using a virtual edge. In some embodiments, the type of virtual edge is automatically identified. For example, based on a history of database search queries and/or associated performances of queries, the types of queries that are performed frequently (e.g., number of times performed within a time period is greater than a threshold) and/or take a relatively long time to complete (e.g., time to provide a response is greater than a threshold amount of time) and can be optimized using a virtual edge (e.g., queries utilize same type of multilevel edge traversals that can be replaced with a single traversal of a virtual edge) are identified. In some embodiments, identifying the type of virtual edge includes determining that at least a threshold number of previously processed search queries utilize the same type of multilevel edge traversals that can be replaced with a single traversal of the type of virtual edge to be created.

At 404, a virtual edge generation rule that corresponds to the type of virtual edge to be created is generated. In some embodiments, generating the virtual edge generation rule includes identifying a set of conditions/triggers that when detected in combination trigger generation of an associated virtual edge. The triggering conditions may specify a desired type of each of the two edges that must be connected to a focal vertex (e.g., detect edges of a triangle to be completed in a graph data model using a virtual edge). For example, a label identifier and/or one or more properties of each of the edges to be detected are specified. In various embodiments, the virtual edge generation rule specifies one or more of the following that must be detected for one or more edges and/or adjacent vertices of a single focal vertex: a label identifier, a unique identifier, an identifier range, an edge direction, and a property of an edge/vertex. In some embodiments, the virtual edge generation rule is stored in a storage and distributed to a plurality of nodes of one or more clusters for execution.

At 406, the virtual edge generation rule is applied to a graph database to identify virtual edges to be generated. In some embodiments, applying the virtual edge generation rule includes analyzing data stored in the graph database to identify virtual edges to be generated. For example, each vertex-centric index of the graph database is utilized to determine whether triggering conditions of the virtual edge generation rule are detected. In some embodiments, applying the virtual edge generation rule includes including the virtual edge generation rule in a list of edge generation rules to be triggered when data is added/deleted/modified in the graph database. For example, when a database operation is performed to add, remove, or modify data, the operation is configured to verify whether the operation has changed data in a manner that triggers creation or removal of a virtual edge in response to the operation.

In some embodiments, the unique identifier is an assigned identifier that uniquely identifies a specific generated instance of a virtual edge. In some embodiments, the derived identifier is derived using information about at least the two edges that triggered the creation of the virtual edge. For example, an identifier (e.g., label identifier, unique identifier, etc.) of one edge is combined with an identifier of another edge along with identifiers of vertices connected by the virtual edge to derive the derived identifier. In various examples, the edge identifiers and/or the vertex identifiers are sorted, combined, and/or hashed (e.g., using a hash function) to generate the derived identifier. The derived identifier may be utilized to identify whether the associated virtual edge is unique (e.g., determine whether the virtual edge has been already included in a vertex-centric index). For example, due to a distributed fault tolerant nature of the graph database, multiple nodes may be tasked to generate the same virtual node and each of these instances may have different unique identifiers assigned to them despite being the same virtual edge. To ensure that duplicate virtual edges are not indexed in the same index, the derived identifier may be utilized to determine whether any other saved/indexed virtual edges of the index include the same derived identifier.

In some embodiments, data elements of a graph database are timestamped to ensure proper ordering of data and operations. In some embodiments, a timestamp associated with the virtual identifier is selected based on timestamps of the at least two edges that triggered the creation of the virtual edge. For example, each of the triggering edges are associated with creation/insertion timestamps and the latest timestamp of the two triggering edges is selected as the timestamp (e.g., creation/insertion timestamp) of the virtual edge. This may ensure proper time ordering of the virtual edge with respect to other edges of the graph database. The timestamp of the virtual edge may also be used in conjunction with the derived identifier to also identify unique virtual edges.

At 408, vertex-centric indices of the vertices connected by the identified virtual edge are updated. In some embodiments, an entry for the virtual edge is added/indexed to each of the vertex-centric indices of the vertices connected by the virtual edge. The entry/indexed data may include a unique identifier of the virtual edge, a derived identifier identifying components of the virtual edge, a timestamp, an identifier/label of a new adjacent vertex connected by the virtual edge, and/or a property of the virtual edge and/or a new adjacent vertex connected by the virtual edge. In some embodiments, in the event multiple virtual edges are generated due to executing of a single virtual edge generation rule, the multiple virtual edges are held and the vertex-centric indices of the vertices connected by the held virtual edges are updated together to ensure a consistent state.

Figure 5:
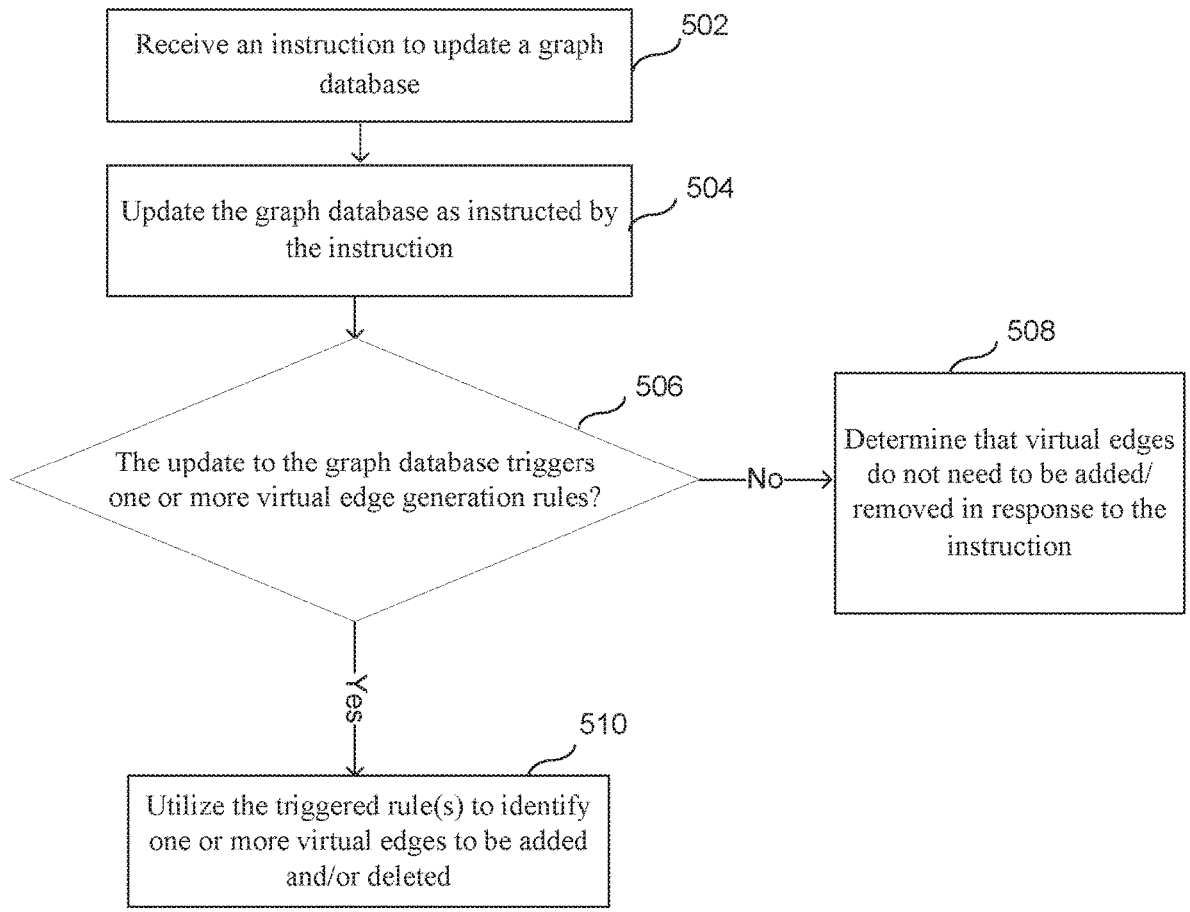
FIG. 5 is a flowchart illustrating an embodiment of a process for updating a graph database implementing one or more virtual edge generation rules.

FIG. 5 is a flowchart illustrating an embodiment of a process for updating a graph database implementing one or more virtual edge generation rules. The process of FIG. 5 may be implemented on one or more nodes of node cluster 202 and/or node cluster 204. In some embodiments, the process of FIG. 5 is included in 304 of FIG. 3. In some embodiments, the process of FIG. 5 is included in 406 of FIG. 4.

At 502, an instruction to update a graph database is received. In various embodiments, the received instruction includes an instruction to add, delete, and/or modify data of an edge and/or a vertex of the graph database. The instruction may be related to a label and/or a property of an edge and/or a vertex. In some embodiments, the received instruction includes an instruction to add, remove, and/or modify an entry to a vertex-centric index.

At 504, the graph database is updated as instructed by the instruction. For example, data specified by the received instruction is added, deleted, and/or modified to/from the graph database. In some embodiments, updating the graph database includes updating one or more vertex-centric indices.

At 506, it is determined whether the update to the graph database triggers one or more virtual edge generation rules. This determination is performed as a result of processing the instruction. For example, this determination is triggered as a part of completing a database operation to modify the database. In some embodiments, determining whether the update triggers one or more graph database rules includes determining whether the data being added or resulting data after the modification or data to be deleted or modified is associated with a triggering condition of any of the one or more virtual edge generation rules. For example, in the event data (e.g., edge) is being added or modified, if the added data or resulting modified data satisfies at least a portion of triggering conditions of a virtual edge generation rule, the rule is triggered. In another example, in the event data is being deleted and/or modified, if the data to be deleted or modified was a triggering condition of a virtual edge generation rule that generated an existing virtual edge, the rule is triggered.

If at 506 it is determined that the update to the graph database does not trigger a virtual edge generation rule, at 508, it is determined that virtual edges do not need to be added/removed in response to the instruction.

If at 506 it is determined that the update to the graph database does trigger one or more rules, at 510, the triggered rule(s) are utilized to identify one or more virtual edges to be added and/or deleted. In some embodiments, for a rule triggered to potentially add a new virtual edge, it is determined whether all of the triggering conditions for the rule are satisfied to generate the new virtual edge, and in the event that all of the conditions have been satisfied, the new virtual edge is generated. In some embodiments, for a rule triggered for an already existing virtual edge, it is determined whether all of the conditions for the existing virtual edge are still satisfied, and in the event the all of the conditions are no longer satisfied, the existing virtual edge is identified for deletion.

In some embodiments, the process proceeds to 408 of FIG. 4. For example, one or more entries corresponding to the generated/identified virtual edge are added or removed, as appropriate, from the appropriate vertex-centric indices. In various embodiments, any number of steps of FIG. 5 may be executed simultaneously. For example, steps 504, 506 and/or 510 are executing in parallel to ensure that resulting updates (e.g., including index updates and virtual edges) all happen logically together to expose a consistent state to a user.

Figure 6:
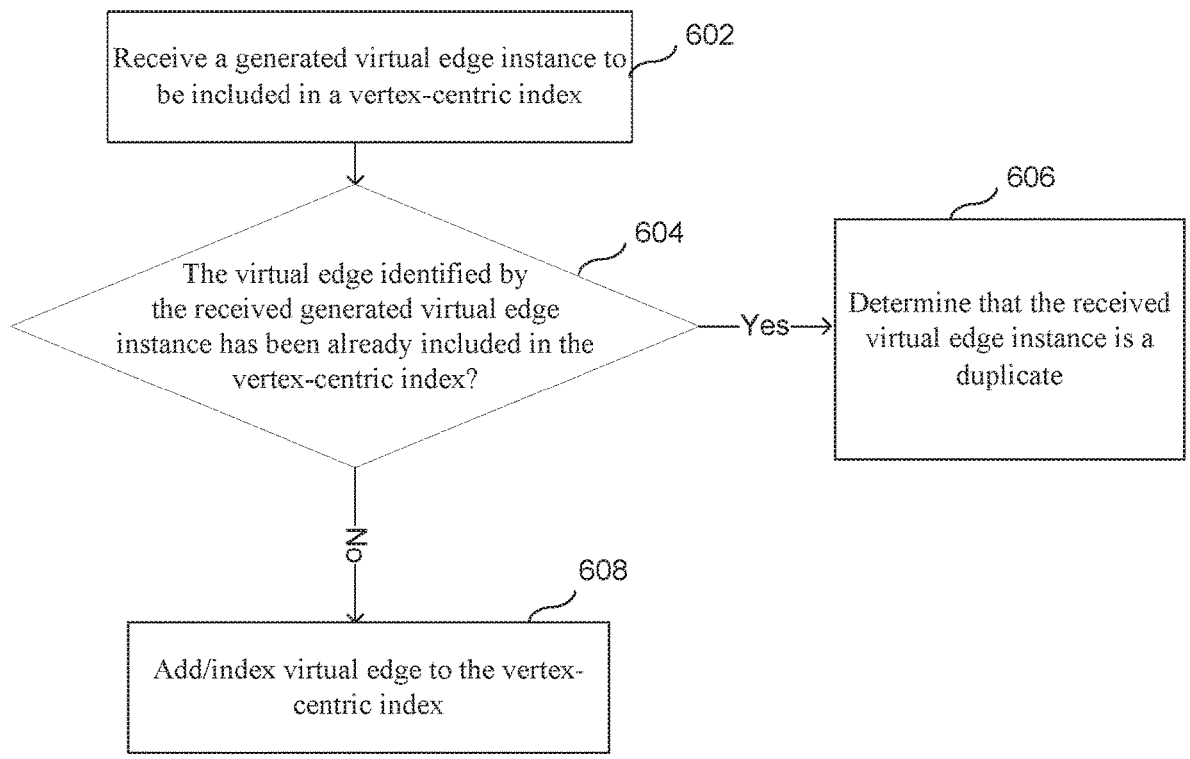
FIG. 6 is a flowchart illustrating an embodiment of a process for updating a vertex-centric index to include a virtual edge.

FIG. 6 is a flowchart illustrating an embodiment of a process for updating a vertex-centric index to include a virtual edge. The process of FIG. 6 may be implemented on one or more nodes of node cluster 202 and/or node cluster 204. In some embodiments, the process of FIG. 6 is included in 304 of FIG. 3. In some embodiments, the process of FIG. 6 is included in 408 of FIG. 4.

At 602, a generated virtual edge instance to be included in a vertex-centric index is received. In some embodiments, the generated virtual edge instance is the virtual edge in 406 of FIG. 4.

At 604, it is determined whether the virtual edge identified by the received generated virtual edge instance has been already included in the vertex-centric index. For example, due to a distributed fault tolerant nature of the graph database, multiple nodes may be tasked to generate the same virtual node and each of these instances may have different unique identifiers assigned to them despite being the same virtual edge. To ensure that duplicate virtual edges are not saved in the vertex-centric index, a derived identifier may be utilized to determine whether any other virtual edges included in the index have the same derived identifier.

In some embodiments, the derived identifier is generated using information about at least the two edges that triggered the creation of the virtual edge. For example, an identifier (e.g., label identifier, unique identifier, etc.) of one edge is combined with an identifier of another edge along with identifiers of vertices connected by the virtual edge to derive the derived identifier. In various examples, the edge identifiers and/or the vertex identifiers are sorted, combined, and/or hashed (e.g., using a hash function) to generate the derived identifier.

In some embodiments, a timestamp associated with the virtual vertex instance has been selected based on timestamps of the at least two edges that triggered the creation of the virtual edge instance. For example, each of the triggering edges are associated with creation/insertion timestamps and the latest timestamp of the two triggering edges is selected as the timestamp (e.g., creation/insertion timestamp) of the virtual edge instance.

In some embodiments, determining whether the virtual edge has been already included in the index includes determining whether any virtual edge included in the index includes the same determined identifier and timestamp of the received virtual edge instance. In the event a matching entry is found, it is determined that the virtual edge has been already included in the index and in the event a matching entry is not found, it is determined that the virtual edge has not been already included in the index. In some embodiments, rather than using both the determined identifier and timestamp to search for a matching entry, only the determined identifier is utilized.

If at 604, it is determined that the virtual edge identified by the received generated virtual edge instance has been already included in the vertex-centric index, at 606, it is determined that the received virtual edge instance is a duplicate. The duplicate instance may be discarded and not added/indexed to the vertex-centric index.

If at 604, it is determined that the virtual edge identified by the received generated virtual edge instance has not been already included in the vertex-centric index, at 608, the virtual edge is added/indexed to the vertex-centric index. The entry/indexed data may include one or more of the following: a unique identifier of the virtual edge, a derived identifier identifying the edges associated with the virtual edge, a selected timestamp, an identifier of a vertex connected by the virtual edge, a label of a vertex connected by the virtual edge, and a property of a vertex connected by the virtual edge.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a plurality of storage nodes storing at least a portion of a graph database having a plurality of vertex-centric indices; and
    a processor configured to:
        identify a new virtual edge to be generated based on a plurality of existing edges of the graph database including by being configured to identify that at least a pair of a first vertex and a third vertex that are not directly connected by the plurality of existing edges but are already indirectly connected via at least one other second vertex between the first vertex and the third vertex and the plurality of existing edges of the graph database are to be directly connected via the new virtual edge directly connecting the first vertex and the third vertex, wherein as compared to traversing the plurality of existing edges indirectly connecting the pair of the first vertex and the third vertex via at least the second vertex, using the new virtual edge to directly traverse between the first vertex and the third vertex that were not previously directly connected bypasses the second vertex between the first vertex and the third vertex and reduces a number of database edge traversals between the first vertex and the third vertex performed during processing of a database query;
        generate the new virtual edge connecting at least the pair of vertices that were not previously directly connected; and
        update the plurality of vertex-centric indices to include information about the new virtual edge;
    wherein
        a first vertex-centric index of the vertex-centric indices for a first vertex of the pair of vertices includes a first stored list of edges for the first vertex,
        the first vertex-centric index is stored on a first storage node of the plurality of storage nodes,
        the first stored list of edges for the first vertex identifies at least two different category types of edges including by identifying at least some of the edges in the first stored list of edges as one or more virtual edges of the first vertex,
        a second vertex-centric index of the vertex-centric indices for the third vertex of the pair of vertices includes a second stored list of edges for the third vertex,
        the second vertex-centric index is stored on a second storage node of the plurality of storage nodes different from the first storage node of the plurality of storage nodes,
        the second stored list of edges for the third vertex identifies at least two different category types of edges including by identifying at least some of the edges in the second stored list of edges as one or more virtual edges of the third vertex, and
        the first vertex-centric index is different from the second vertex-centric index, and the first vertex-centric index is a separate vertex-centric index specific for the edges of the first vertex including the one or more virtual edges of the first vertex, and the second vertex-centric index is a separate vertex-centric index specific for the edges of the third vertex including the one or more virtual edges of the third vertex.

2. The system of claim 1, wherein the plurality of existing edges are edges of the second vertex and the second vertex is not either of the pair of vertices.

3. The system of claim 1, wherein the new virtual edge completes a triangle in a data model of the graph database with the plurality of existing edges of the graph database.

4. The system of claim 1, wherein the new virtual edge is inferred based on the plurality of edges.

5. The system of claim 1, wherein one of the plurality of vertex-centric indices is specific to one of the pair of vertices.

6. The system of claim 1, wherein the system is a node in a cluster of nodes.

7. The system of claim 1, wherein the graph database is implemented using a NoSQL database.

8. The system of claim 1, wherein identifying the new virtual edge to be generated includes determining whether a triggering criteria of a virtual edge generation rule has been satisfied.

9. The system of claim 8, wherein the new virtual edge generation rule has been automatically determined based on a history of database queries.

10. The system of claim 8, wherein the new virtual edge generation rule has been automatically determined based on a performance of database queries.

11. The system of claim 1, wherein the plurality of existing edges connect together at least three different vertices of the graph database.

12. The system of claim 1, wherein generating the new virtual edge includes determining a derived identifier using information about the plurality of edges.

13. The system of claim 12, wherein determining the derived identifier includes hashing at least an identifier of a first edge included in the plurality of existing edges and an identifier of a second edge included in the plurality of edges.

14. The system of claim 1, wherein generating the new virtual edge includes selecting a latest timestamp among timestamps of the plurality of existing edges as a timestamp of the new virtual edge.

15. The system of claim 1, wherein updating the plurality of vertex-centric indices includes determining whether the new virtual edge has been previously indexed in an index included in the plurality of vertex-centric indices.

16. The system of claim 15, wherein determining whether the new virtual edge has been previously indexed includes determining whether any previously indexed virtual edges included in the index are associated with a same derived identifier and a same timestamp as the new virtual edge.

17. The system of claim 1, wherein the processor is further configured to receive an instruction to delete one of the plurality of existing edges and in response, detect that the edge to be deleted is associated with the new virtual edge and automatically delete the new virtual edge by removing information about the new virtual edge from the plurality of vertex-centric indices.

18. The system of claim 1, wherein the processor is further configured to receive the database query, identify that the database query can be optimized to utilize the new virtual edge, and configure the database query to utilize the new virtual edge.

19. A method, comprising:
storing at a plurality of storage nodes at least a portion of a graph database having a plurality of vertex-centric indices;
using a processor to identify a new virtual edge to be generated based on a plurality of existing edges of the graph database including by being configured to identify that at least a pair of a first vertex and a third vertex that are not directly connected by the plurality of existing edges but are already indirectly connected via at least one other second vertex between the first vertex and the third vertex and the plurality of existing edges of the graph database are to be directly connected via the new virtual edge directly connecting the first vertex and the third vertex, wherein as compared to traversing the plurality of existing edges indirectly connecting the pair of the first vertex and the third vertex via at least the second vertex, using the new virtual edge to directly traverse between the first vertex and the third vertex that were not previously directly connected bypasses the second vertex between the first vertex and the third vertex and reduces a number of database edge traversals between the first vertex and the third vertex performed during processing of a database query;
generating the new virtual edge connecting at least the pair of vertices that were not previously directly connected; and
updating the plurality of vertex-centric indices to include information about the new virtual edge;
wherein
a first vertex-centric index of the vertex-centric indices for a first vertex of the pair of vertices includes a first stored list of edges for the first vertex,
the first vertex-centric index is stored on a first storage node of the plurality of storage nodes,
the first stored list of edges for the first vertex identifies at least two different category types of edges including by identifying at least some of the edges in the first stored list of edges as one or more virtual edges of the first vertex,
a second vertex-centric index of the vertex-centric indices for the third vertex of the pair of vertices includes a second stored list of edges for the third vertex, the second vertex-centric index is stored on a second storage node of the plurality of storage nodes different from the first storage node of the plurality of storage nodes,
the second stored list of edges for the third vertex identifies at least two different category types of edges including by identifying at least some of the edges in the second stored list of edges as one or more virtual edges of the third vertex, and
the first vertex-centric index is different from the second vertex-centric index, and the first vertex-centric index is a separate vertex-centric index specific for the edges of the first vertex including the one or more virtual edges of the first vertex, and the second vertex-centric index is a separate vertex-centric index specific for the edges of the third vertex including the one or more virtual edges of the third vertex.

20. A computer program product, the computer program product being embodied in a non-transitory computer readable storage medium and comprising computer instructions for:
storing at a plurality of storage nodes at least a portion of a graph database having a plurality of vertex-centric indices;
identifying a new virtual edge to be generated based on a plurality of existing edges of the graph database including by being configured to identify that at least a pair of a first vertex and a third vertex that are not directly connected by the plurality of existing edges but are already indirectly connected via at least one other second vertex between the first vertex and the third vertex and the plurality of existing edges of the graph database are to be directly connected via the new virtual edge directly connecting the first vertex and the third vertex, wherein as compared to traversing the plurality of existing edges indirectly connecting the pair of the first vertex and the third vertex via at least the second vertex, using the new virtual edge to directly traverse between the first vertex and the third vertex that were not previously directly connected bypasses the second vertex between the first vertex and the third vertex and reduces a number of database edge traversals between the first vertex and the third vertex performed during processing of a database query;
generating the new virtual edge connecting at least the pair of vertices that were not previously directly connected; and
updating the plurality of vertex-centric indices to include information about the new virtual edge;
wherein
a first vertex-centric index of the vertex-centric indices for a first vertex of the pair of vertices includes a first stored list of edges for the first vertex,
the first vertex-centric index is stored on a first storage node of the plurality of storage nodes,
the first stored list of edges for the first vertex identifies at least two different category types of edges including by identifying at least some of the edges in the first stored list of edges as one or more virtual edges of the first vertex,
a second vertex-centric index of the vertex-centric indices for the third vertex of the pair of vertices includes a second stored list of edges for the third vertex, the second vertex-centric index is stored on a second storage node of the plurality of storage nodes different from the first storage node of the plurality of storage nodes, the second stored list of edges for the third vertex identifies at least two different category types of edges including by identifying at least some of the edges in the second stored list of edges as one or more virtual edges of the third vertex, and the first vertex-centric index is different from the second vertex-centric index, and the first vertex-centric index is a separate vertex-centric index specific for the edges of the first vertex including the one or more virtual edges of the first vertex, and the second vertex-centric index is a separate vertex-centric index specific for the edges of the third vertex including the one or more virtual edges of the third vertex.

* * * * *